United States Patent [19]

Bone et al.

[11] Patent Number: 5,466,106
[45] Date of Patent: Nov. 14, 1995

[54] CLAMP NUT

[75] Inventors: Daniel Bone; Kevin Stones, both of Durham, England

[73] Assignee: Black & Decker Inc., Newark, Del.

[21] Appl. No.: 269,475

[22] Filed: Jun. 30, 1994

[30] Foreign Application Priority Data

Jul. 1, 1993 [GB] United Kingdom ............... 9313633

[51] Int. Cl.6 .................. F16B 37/08; F16B 39/36
[52] U.S. Cl. .................. 411/433; 411/267; 411/270
[58] Field of Search .................. 411/266, 267, 411/270, 432, 433, 947

[56] References Cited

U.S. PATENT DOCUMENTS

| 2,729,038 | 1/1956 | Hutchins . | |
| 4,083,393 | 4/1978 | Okada | 411/267 |
| 4,768,909 | 9/1988 | Warkotsch . | |
| 5,118,237 | 6/1992 | Wright . | |
| 5,139,381 | 8/1992 | Lugreski et al. | 411/433 |
| 5,175,963 | 1/1993 | Schäfer et al. . | |
| 5,282,709 | 2/1994 | Chaput et al. | 411/433 |
| 5,303,606 | 4/1994 | Kokinda | 411/433 X |

FOREIGN PATENT DOCUMENTS

| 3832624 | 4/1990 | Germany . |
| 4029744 | 3/1992 | Germany . |

*Primary Examiner*—Neill R. Wilson
*Attorney, Agent, or Firm*—Dennis A. Dearing; John D. Del Ponti; Charles E. Yocum

[57] ABSTRACT

A clamp nut 10 comprising a split threaded nut 12 for engaging a threaded spindle (not shown), a coiled spring 16 encircling the split nut 12, means 20 for holding the spring 16 tightly coiled around the split nut 12 and a cap 30, engaging the spring 16, which can be turned in a first direction (A) to tighten the spring 16 around the split nut 12 and in a reverse direction to release the holding means 20 thereby loosening the spring 16 around the split nut 12 and enabling the split nut 12 to expand radially to facilitate removal of the clamp nut 10 from a threaded spindle. The mechanism for releasing the holding means 20 preferably includes a cam surface 32, formed integrally with the cap 30, which lifts an end 19 of the coiled spring 16 off a set of ratchet teeth.

12 Claims, 2 Drawing Sheets

CLAMP NUT

BACKGROUND OF THE INVENTION

This invention relates to clamp nuts, and in particular to a clamp nut for securing rotary discs onto the spindles of power tools, such as a grinding wheel on to the spindle of an angle grinder or a circular saw blade on to the spindle of a circular saw.

Conventionally the spindles of such power tools are screw threaded and the discs have been secured by a lock nut which is locked in place by a spanner and which must also be released by use of the spanner. More recently, flange locks have been developed which can be safely secured and released by hand without the use of a tool. The present invention aims to provide an improved clamp nut which can be secured and released by hand.

SUMMARY OF THE INVENTION

In accordance with the foregoing, the present invention provides a clamp nut comprising a split threaded nut for engaging a threaded spindle, a coiled spring encircling the split nut, means for holding the spring tightly coiled around the split nut and a cap, engaging the spring, which can be turned in a first direction to tighten the spring around the split nut and in a reverse direction to release the holding means thereby loosening the spring around the split nut and enabling the split nut to expand radially to facilitate removal of the clamp nut from a threaded spindle.

A significance advantage of a clamp nut according to the present invention is that the initial tightness of the nut on a spindle of a power tool, for example, can be readily released, thereby facilitating complete removal of the clamp nut from the spindle.

Preferably the holding means includes a ratchet face which engages the coiled spring.

The ratchet face may be formed on a pressure member which supports the split nut. Alternatively, the ratchet face could possibly be formed on the split nut itself.

The pressure member preferably includes guide pegs which engage slots in the split nut to control the radial movement of the split nut.

A first end of the coiled spring may engage in a recess in the split nut to prevent rotation of the spring around the nut. Alternatively, the first end of the coiled spring could engage a recess in the pressure member.

Preferably the cap includes a cam surface for bearing against a second end of the coiled spring to release the coiled spring from the holding means when the cap is turned in the reverse direction.

At least one stop may be provided for restricting the relative rotation between the cap and the split nut. By including a pair of stops to limit the arc of movement of the cap, the tightening/releasing forces applied by the cap are not solely transmitted via the spring; the stops can carry much of these forces.

The cap preferably includes a central aperture through which a threaded spindle can pass, in use, if necessary. Further, a circlip preferably engages a groove in the cap to retain the coiled spring, split nut and pressure member together.

An O-ring may form a seal between the cap and the split nut to prevent debris from entering the clamp nut.

The threaded nut is preferably split into three segments. The nut could, of course, alternatively be split into four or some other number of segments.

BRIEF DESCRIPTION OF THE DRAWINGS

Specific embodiments of the present invention are now described, by way of example only, with reference to the accompanying drawings, in which.

DESCRIPTION OF PREFERRED EMBODIMENT

Figure 1:
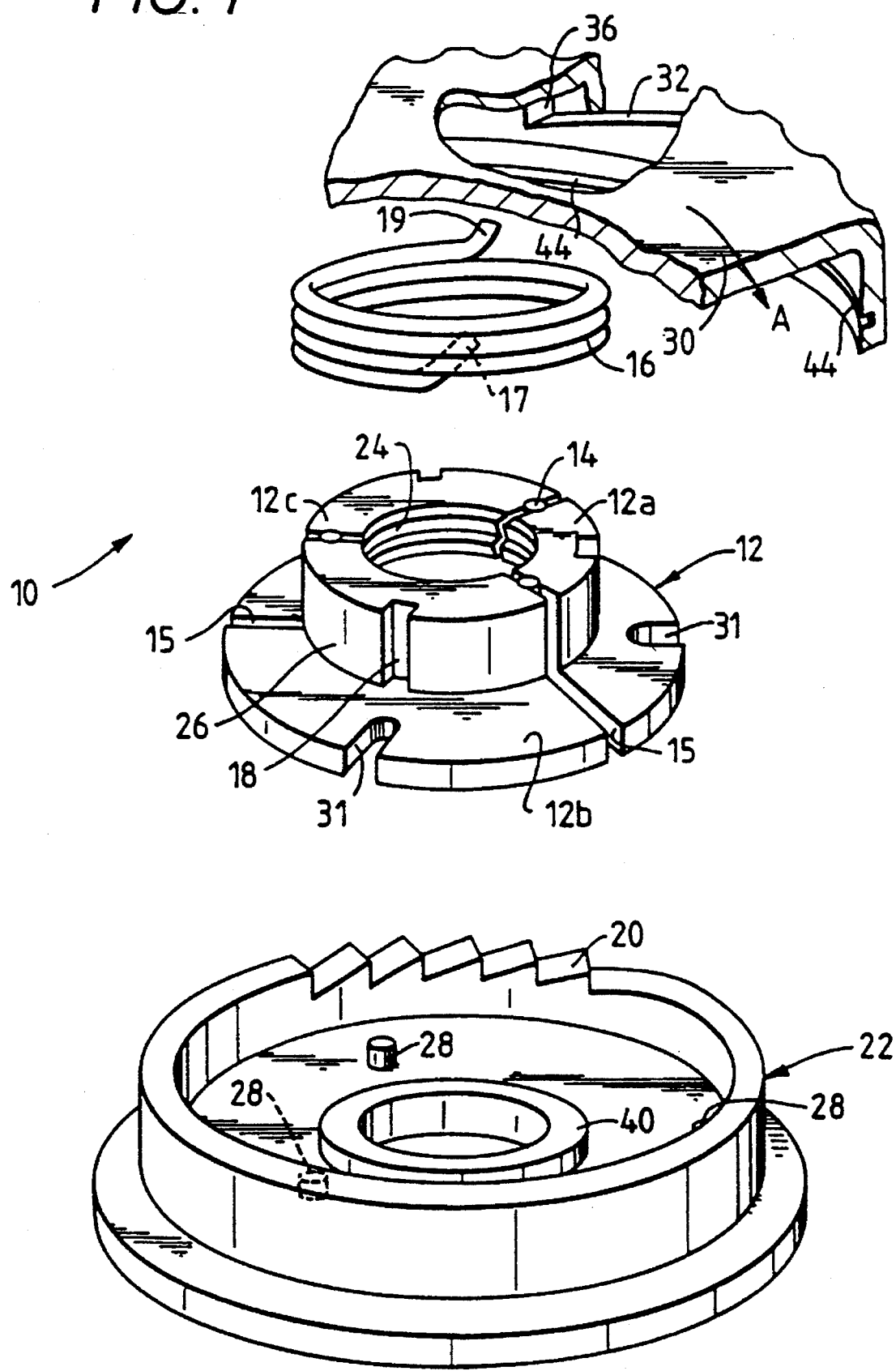
FIG. 1 is an exploded view of a clamp nut according to the present invention.

A clamp nut 10 for use on an angle grinder or other power tool having a threaded spindle comprises a split threaded "collet" 12. The collet is sintered and machined as one piece and then broken in a controlled manner to enable it to expand in use. In the specific embodiment shown in the drawings, the collet is sawn into three segments 12a, b, c, and the segments are held in their original spaced positions by pins 14, the gaps 15 between the segments being the cut lines of a saw through the collet. When the collet is a single sintered piece which is broken, it is not necessary to separate the broken pieces with these pins and they will be omitted. The collet 12 is held in its normal fully contracted state by a close coiled spring 16. An internally formed end 17 of the spring 16 engages with a groove 18 in an outer surface of the collet 12. The other, externally formed, end 19 of the spring 16 is prevented from rotation by being held on a ratchet face 20 of a pressure member 22. As the clamp nut 10 is hand tightened through a cap 30, the clamping force acting on the threads 24 of the collet 12 attempts to spread the collet 12, but is prevented from doing so by the coil spring 16 which is a close fit on an external cylindrical surface 26 of the collet 12.

To remove a disc from the angle grinder (not shown), the spindle of the angle grinder is locked by normal means (not shown) and the cap 30 is rotated anti-clockwise (opposite to Arrow A in FIG. 1). This movement engages an integral cam surface 32 of the cap 30 with the end 19 of the coil spring 16 and lifts the end 19 clear of the restraining teeth of the ratchet face 20. When the end 19 of the coil spring 16 reaches to upper end 34 of the cam slope, further turning motion of the cap 30 "unwraps" the spring 16 and allows space for the collet 12 to expand radially. This normally happens after the unwrapped spring 16 bottoms against its stop. The expansion of the collet 12 immediately frees the clamping force on the disc and the nut 10 can be unscrewed.

Once the spreading force on the collet 12 has been removed, because the threads of the angle grinder spindle are no longer tending to pull out of the bore of the collet 12, the spring 16 can turn the collet 12 itself, thereby returning the spring 16 and the collet 12 to their original state.

The collet 12 is rotationally fixed with respect to the pressure member 22 by a plurality of pegs 28, which engage corresponding slots 31 in the collet 12.

Figure 2:
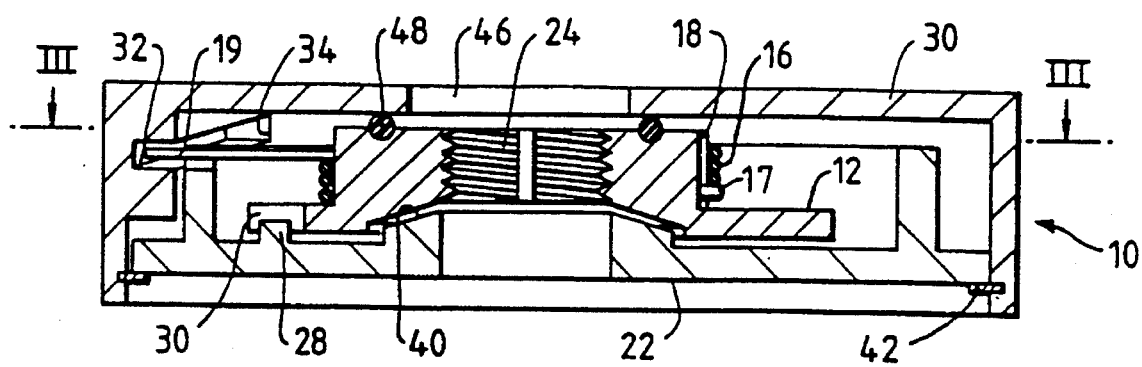
FIG. 2 is a sectional side view of the clamp nut of FIG. 1 in its assembled form.
Figure 3:
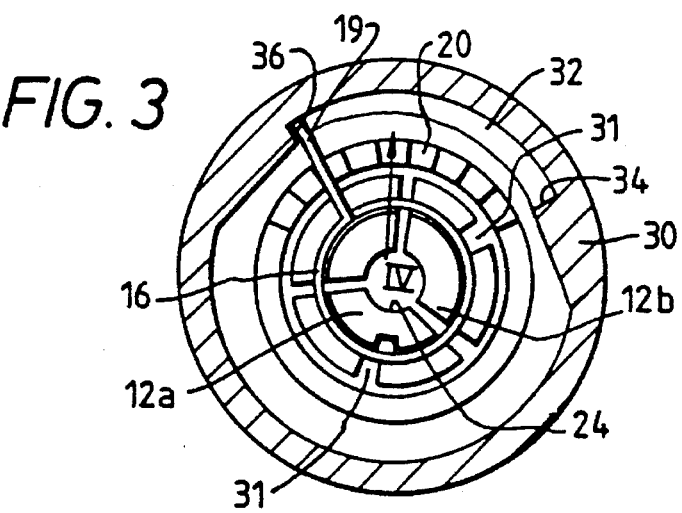
FIG. 3 is a section on line III—III in FIG. 2.
Figure 4:
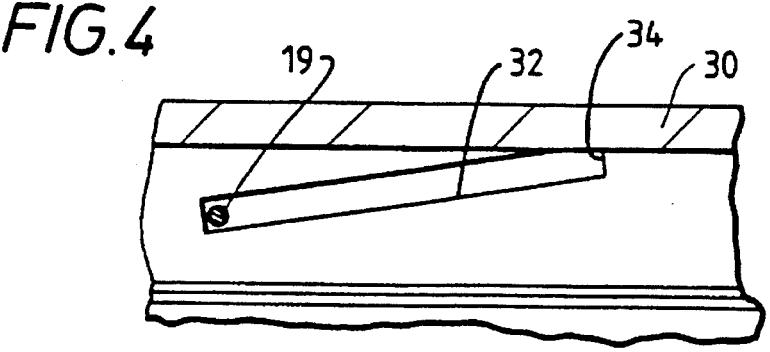
FIG. 4 is a view in the direction of Arrow IV in FIG. 3.

As can be seen more readily in FIG. 2, the collet 12 seats on a flange 40 of the pressure plate 22. The flange 40 in this embodiment is sloped to assist spreading of the collet 12 when the coil spring 16 is released.

When the clamp nut 10 is applied to an angle grinder spindle, the cap 30 is turned in a clockwise direction (Arrow A in FIG. 1) to bring the pressure plate 22 into contact with the grinding wheel mounted on the spindle. The externally formed end 19 of the spring 16 engages end 36 of the cam surface 32 and is therefore lowered so that it engages the teeth of the ratchet face 20. Further turning of the cap 30 may tighten the spring 16 around the collet 12 by snapping over the teeth of the rack 20. Thereafter the collet 12 and pressure plate 22 are rotated, such that the collet 12 is screwed on to the spindle of the angle grinder. A stop (not shown) may be provided on the cap 30 to engage the pressure plate 22, so that the tightening forces applied by the cap 30 are not solely transmitted via the spring 16. Likewise, a stop (not shown) can be provided for use in the reverse direction, so that the cap 30 only has a limited arc of movement relative to the pressure plate 22 (and hence the collet 12).

A circlip 42 is received in a groove 44 in the cap 30 to retain the assembly together. A central hole 46 in the cap 30 allows the spindle of the angle grinder to screw through the cap 30, if necessary. Finally, an O-ring 48 is provided between the cap 30 and the collet 12 to seal the interior of the clamp nut 10.

It will of course be understood that the present invention has been described above purely by way of example, and that modifications of detail can be made within the scope of the invention.

We claim:

1. A clamp nut comprising a split threaded nut for engaging a threaded spindle, a coiled spring closely encircling the split nut, means for holding the spring coiled around the split nut and a cap, engaging the spring, which can be turned in a first direction to engage the spring with said holding means and in a reverse direction to release the holding means thereby enabling loosening of the spring around the split nut and whereby the split nut can expand radially to facilitate removal of the clamp nut from the threaded spindle.

2. A clamp nut as claimed in claim 1, wherein the holding means includes a ratchet face which engages the coiled spring.

3. A clamp nut as claimed in claim 2, wherein the ratchet face is formed on a pressure member which supports the split nut.

4. A clamp nut as claimed in claim 3, wherein the pressure member includes guide pegs which engage slots in the split nut to control the radial movement of the split nut.

5. A clamp nut as claimed in claim 1, wherein a first end of the coiled spring engages a recess in the split nut to prevent rotation of the spring around the split nut.

6. A clamp nut as claimed in claim 1, wherein the cap includes a cam surface for bearing against a second end of the coiled spring to release the coiled spring from the holding means when the cap is turned in the reverse direction.

7. A clamp nut as claimed in claim 1, wherein at least one stop is provided for restricting relative rotation between the cap and the split nut.

8. A clamp nut as claimed in claim 1, wherein the cap includes a central aperture through which a threaded spindle can pass, in use.

9. A clamp nut as claimed in claim 1, wherein a circlip engages a groove in the cap to retain the coiled spring, the split nut and the holding means together.

10. A clamp nut as claimed in claim 1, wherein an O-ring forms a seal between the cap and the split nut.

11. A clamp nut as claimed in claim 1, wherein the threaded nut is split into three segments.

12. A clamp nut as claimed in claim 3 in which said split nut is supported on a frusto-conical surface of said pressure member to facilitate said radial expansion of the split nut.

* * * * *